United States Patent
Sato et al.

(10) Patent No.: US 8,208,276 B2
(45) Date of Patent: Jun. 26, 2012

(54) POWER CONVERSION DEVICE

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP)

(73) Assignee: Toshiba Mitsubishi-Electric Indsutrial Systems Corporation, Tokyo (JP)

( * ) Notice: Subject to any disclaimer, the term of this patent is extended or adjusted under 35 U.S.C. 154(b) by 102 days.

(21) Appl. No.: 12/812,709

(22) PCT Filed: Feb. 20, 2009

(86) PCT No.: PCT/JP2009/053016
§ 371 (c)(1),
(2), (4) Date: Jul. 13, 2010

(87) PCT Pub. No.: WO2010/095241
PCT Pub. Date: Aug. 26, 2010

(65) Prior Publication Data
US 2011/0051478 A1 Mar. 3, 2011

(51) Int. Cl.
*H02M 7/537* (2006.01)
*H02H 7/122* (2006.01)
(52) U.S. Cl. .......................... 363/131; 363/55
(58) Field of Classification Search .............. 363/55–58, 363/131–139
See application file for complete search history.

(56) References Cited

U.S. PATENT DOCUMENTS

| | | | | |
|---|---|---|---|---|
| 5,790,396 A | * | 8/1998 | Miyazaki et al. | 363/96 |
| 5,859,772 A | * | 1/1999 | Hilpert | 363/56.03 |
| 2005/0162799 A1 | | 7/2005 | Anand et al. | |
| 2010/0110742 A1 | * | 5/2010 | West | 363/132 |
| 2011/0299307 A1 | * | 12/2011 | Sato et al. | 363/34 |

FOREIGN PATENT DOCUMENTS

| | | |
|---|---|---|
| JP | 6 6984 | 1/1994 |
| JP | 10-243660 | 9/1998 |
| JP | 2000 350465 | 12/2000 |
| JP | 2003 70262 | 3/2003 |
| JP | 2004 248479 | 9/2004 |
| JP | 2006 109603 | 4/2006 |
| JP | 2008 67566 | 3/2008 |
| JP | 2009 27818 | 2/2009 |

OTHER PUBLICATIONS

Notice of Allowance (with English translation) issued on Jan. 31, 2012, in counterpart Korean Appln. No. 2010-7016576 (3 pages).

* cited by examiner

*Primary Examiner* — Jessica Han
(74) *Attorney, Agent, or Firm* — Oblon, Spivak, McClelland, Maier & Neustadt, L.L.P.

(57) ABSTRACT

A three-level PWM converter includes first to third fuses having one terminals connected to a DC positive bus, a DC negative bus and a DC neutral point bus, respectively, first and second IGBT elements connected between respective ones of the other terminals of the first and second fuses and an AC line, an AC switch connected between the AC line and the other terminal of the third fuse, first and second diodes connected in anti-parallel to the first and second IGBT elements respectively, a first capacitor connected between the other terminals of the first and third fuses, and a second capacitor connected between the other terminals of the second and third fuses.

9 Claims, 16 Drawing Sheets

(a) Q2R,Q4R ON (t8)

(b) Q4R ON (c) Q3R,Q4R ON (t9)

(d) Q3R ON (e) Q1R,Q3R ON (t10)

(a) Q2U,Q4U ON (t8)

(b) Q4U ON (c) Q3U,Q4U ON (t9)

(d) Q3U ON (e) Q1U,Q3U ON (t10)

(a)

(b)

(c)

(a)

(b)

(c)

(a)

(b)

(c)

(a)

(b)

(c)

POWER CONVERSION DEVICE

TECHNICAL FIELD

The present invention relates to a power conversion device, and particularly to a power conversion device for converting one of DC power and AC power to the other.

BACKGROUND ART

An uninterruptible power supply system has conventionally widely been used as a power supply device for supplying AC power to an important load such as a computer system in a stable manner. For example, as shown in Japanese Patent Laying-Open No. 2006-109603 (Patent Document 1), an uninterruptible power supply system generally includes a converter for converting AC power to DC power, and an inverter for converting DC power to AC power. Usually, the converter converts AC power from a commercial AC power supply to DC power, and supplies the DC power to the inverter while charging a power storage device such as a storage battery. The inverter converts DC power to AC power and supplies the AC power to the load. When the commercial AC power supply fails, power from the power storage device such as a storage battery is supplied to the inverter, which continues to supply AC power to the load.

In addition, a power conversion device including a converter for converting AC power from a commercial AC power supply to DC power and an inverter for converting that DC power to AC power having desired frequency and voltage is also available. For example, Japanese Patent Laying-Open No. 2003-070262 (Patent Document 2) discloses a power conversion device including a three-level PWM converter and a three-level PWM inverter. In this power conversion device, the three-level PWM converter includes four switches connected in series and a smoothing capacitor, and the three-level PWM inverter includes four switches connected in series. In addition, in order to prevent breakage of a highly frequently used switch among eight switches due to heat generation, the highly frequently used switch is constituted of two semiconductor switching elements connected in parallel.

Patent Document 1: Japanese Patent Laying-Open No. 2006-109603
Patent Document 2: Japanese Patent Laying-Open No. 2003-070262

DISCLOSURE OF THE INVENTION

Problems to be Solved by the Invention

In the conventional power conversion device, however, when the switch is broken due to heat generation and a short circuit occurs, a great short-circuit current flows, a smoothing capacitor is overcharged to a voltage $\sqrt{2}$ times as high as in a normal state, and even other circuit components are broken.

In addition, when a switch which tends to easily break is constituted of two semiconductor switching elements, the number of semiconductor switching elements increases, which leads to high cost.

Accordingly, a primary object of the present invention is to provide an inexpensive power conversion device capable of preventing occurrence of an overcurrent and an overvoltage.

Means for Solving the Problems

A power conversion device according to the present invention is a power conversion device provided between an AC line, and a DC positive bus, a DC negative bus and a DC neutral point bus, for converting one of DC power and AC power to the other, including first to third fuses, first and second semiconductor switching elements, an AC switch, first and second diodes, and first and second capacitors. The first fuse has one terminal connected to the DC positive bus. The second fuse has one terminal connected to the DC negative bus. The third fuse has one terminal connected to the DC neutral point bus. The first semiconductor switching element is connected between the other terminal of the first fuse and the AC line. The second semiconductor switching element is connected between the AC line and the other terminal of the second fuse. The AC switch is connected between the AC line and the other terminal of the third fuse. The first and second diodes are connected in anti-parallel to the first and second semiconductor switching elements, respectively. The first capacitor is connected between the other terminals of the first and third fuses. The second capacitor is connected between the other terminals of the second and third fuses.

Effects of the Invention

In the power conversion device according to the present invention, when the semiconductor switching element or the AC switch breaks and a short circuit occurs, the fuse is blown and a path through which a current flows is cut off. Therefore, an overcurrent or an overvoltage is not caused. In addition, as compared with a conventional example where the number of semiconductor switching elements is increased to prevent breakage of a switch, the circuit can be more inexpensive.

DESCRIPTION OF THE REFERENCE SIGNS 1 commercial AC power supply; 2 input filter; 3 three-level PWM converter; 4 three-level PWM inverter; 5 output filter; 6 load; 7 DC voltage converter; 8 storage battery; 10 control device; 11, 11R, 11S, 11T, 19, 19U, 19V, 19W, C1R, C2R, C1S, C2S, C1T, C2T, C1U, C2U, C1V, C2V, C1W, C2W capacitor; 12, 12R, 12S, 12T, 18, 18U, 18V, 18W reactor; 13 DC positive bus; 14 DC negative bus; 15 DC neutral point bus; 31, 36 voltage sensor; 32, 32R, 32S, 32T, 37, SR, SS current sensor; 33 power failure detection circuit; 40 short-circuit detection and protection circuit; 41 overcurrent detection and protection circuit; 100 uninterruptible power supply system; D1R to D4R, D1S to D4S, D1T to D4T, D1U to D4U, D1V to D4V, D1W to D4W, D3$x$, D4$x$ diode; F1R to F4R, F1S to F4S, HT to F3T, HU to F3U, F1V to F3V, F1W to F3W fuse; Q1R to Q4R, Q1S to Q4S, Q1T to Q4T, Q1U to Q4U, Q1V to Q4V, Q1W to Q4W, Q3$x$ to Q5$x$ IGBT element; RL R-phase line; SL S-phase line; TL T-phase line; UL U-phase line; VL V-phase line; and WL W-phase line.

BEST MODES FOR CARRYING OUT THE INVENTION

Figure 1:
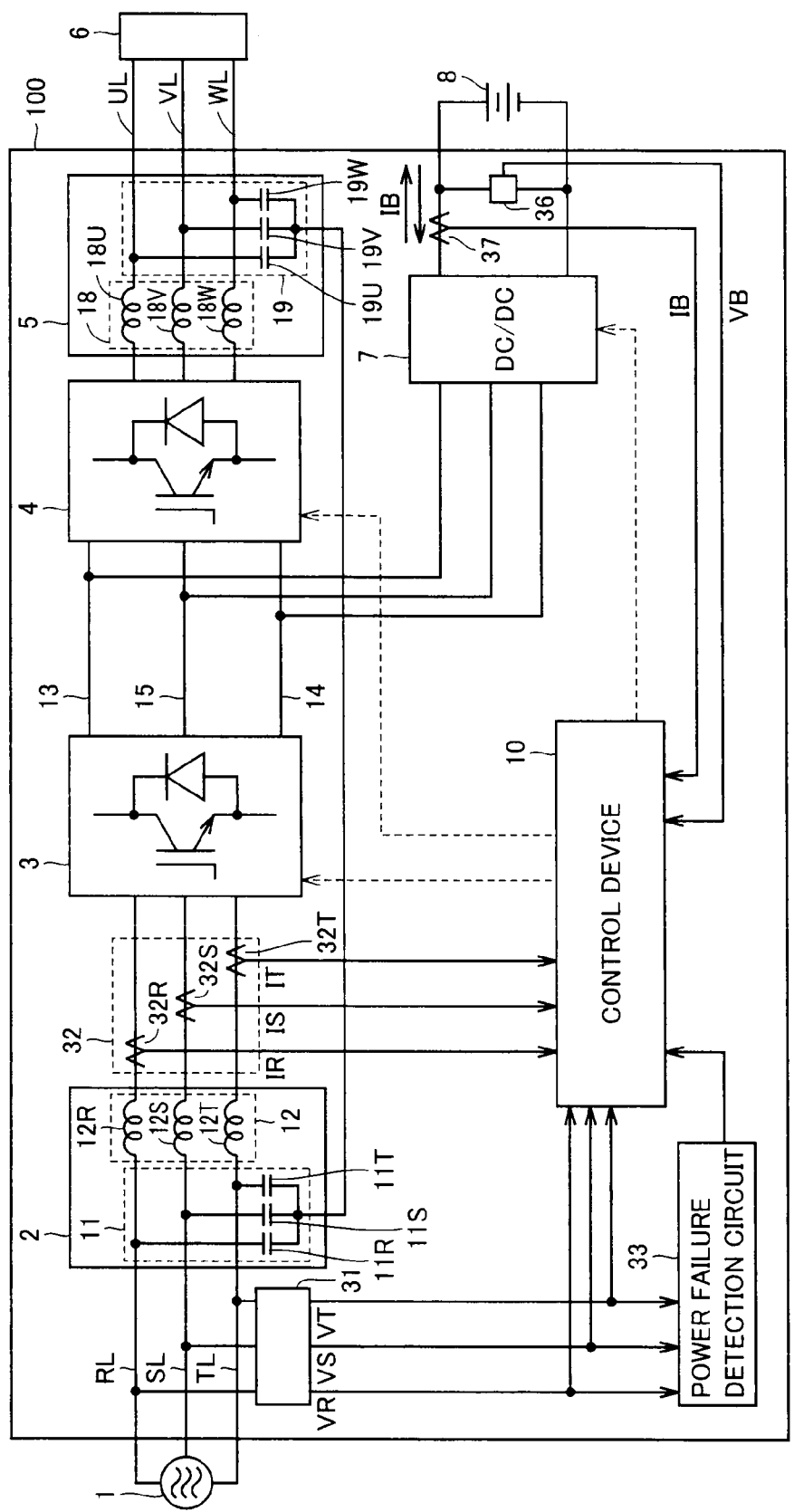
FIG. 1 is a schematic block diagram showing a main circuit configuration of an uninterruptible power supply system according to one embodiment of the present invention.

FIG. 1 is a schematic block diagram showing a main circuit configuration of an uninterruptible power supply system 100 according to one embodiment of the present invention. Referring to FIG. 1, uninterruptible power supply system 100 includes an input filter 2, a three-level PWM converter 3, a three-level PWM inverter 4, an output filter 5, a DC voltage converter (denoted as "DC/DC" in the drawing) 7, a control device 10, a DC positive bus 13, a DC negative bus 14, a DC neutral point bus 15, voltage sensors 31 and 36, current sensors 32 and 37, a power failure detection circuit 33, an R-phase line RL, an S-phase line SL, a T-phase line TL, a U-phase line UL, a V-phase line VL, and a W-phase line WL.

Three-phase AC power from a commercial AC power supply 1, which is a three-phase AC power supply, is supplied to three-level PWM converter 3 through R-phase line RL, S-phase line SL and T-phase line TL. R-phase line RL, S-phase line SL and T-phase line TL are provided with input filter 2. Input filter 2 prevents leakage of harmonics generated in converter 3 to commercial AC power supply 1. Input filter 2 is a three-phase LC filter circuit constituted of a capacitor 11 (capacitors 11R, 11S, and 11T) and a reactor 12 (reactors 12R, 12S, and 12T).

Three-level PWM converter 3 converts three-phase AC power supplied from commercial AC power supply 1 into DC power and supplies the DC power to three-level PWM inverter 4 through DC positive bus 13, DC negative bus 14 and DC neutral point bus 15. Three-level PWM inverter 4 converts the DC power from three-level PWM converter 3 into three-phase AC power.

The three-phase AC power generated by three-level PWM inverter 4 is supplied to a load 6 through U-phase line UL, V-phase line VL and W-phase line WL. U-phase line UL, V-phase line VL and W-phase line WL are provided with output filter 5. Output filter 5 removes harmonics generated by the operation of inverter 4. Output filter 5 is a three-phase LC filter circuit constituted of a reactor 18 (reactors 18U, 18V, and 18W) and a capacitor 19 (capacitors 19U, 19V, and 19W). A neutral point of capacitors 11R, 11S, and 11T of input filter 2 and a neutral point of capacitors 19U, 19V, and 19W of output filter 5 are connected to each other.

DC voltage converter 7 carries out conversion between a DC voltage across DC positive bus 13 and DC negative bus 14 and a voltage of a storage battery 8. It is noted that a power storage device that can be charged and can discharge should only be connected to DC voltage converter 7, and for example, an electric double layer capacitor may be connected to DC voltage converter 7. In addition, though storage battery 8 is installed outside uninterruptible power supply system 100 in the present embodiment, storage battery 8 may be contained in uninterruptible power supply system 100.

Voltage sensor 31 detects a voltage VR of the R-phase line, a voltage VS of the S-phase line, and a voltage VT of the T-phase line, and outputs three-phase voltage signals indicating respective voltages VR, VS and VT to control device 10 and power failure detection circuit 33. Current sensor 32 detects a current IR of the R-phase line, a current IS of the S-phase line, and a current IT of the T-phase line and outputs three-phase current signals indicating respective currents IR, IS and IT to control device 10.

Power failure detection circuit 33 detects power failure of commercial AC power supply 1 based on the three-phase voltage signal from voltage sensor 31. Power failure detection circuit 33 outputs a power failure signal indicating power failure of commercial AC power supply 1 to control device 10. Voltage sensor 36 detects a voltage VB across positive and negative electrodes of storage battery 8 and outputs a signal indicating voltage VB to control device 10. Current sensor 37 detects a current IB input and output to/from storage battery 8 and outputs a signal indicating current IB to control device 10.

Control device 10 controls operations of three-level PWM converter 3, three-level PWM inverter 4 and DC voltage converter 7. Though detailed description will be provided later, each of three-level PWM converter 3, three-level PWM inverter 4 and DC voltage converter 7 is implemented by a semiconductor switch including a semiconductor switching element. In the present embodiment, an IGBT (Insulated Gate Bipolar Transistor) is employed as the semiconductor switching element. In addition, in the present embodiment, PWM (Pulse Width Modulation) control is adopted as a method of controlling the semiconductor switching element. Control device 10 carries out PWM control, upon receiving the three-phase voltage signal from voltage sensor 31, the three-phase current signal from current sensor 32, the power failure signal from power failure detection circuit 33, the signal indicating voltage VB detected by voltage sensor 36, the signal indicating current IB detected by current sensor 37, and the like.

An operation of uninterruptible power supply system 100 according to the present embodiment will now be described. While commercial AC power supply 1 can normally supply AC power, three-level PWM converter 3 converts AC power from commercial AC power supply 1 to DC power and three-level PWM inverter 4 converts the DC power into AC power and supplies the AC power to load 6. DC voltage converter 7 converts the DC voltage from three-level PWM converter 3 into a voltage suitable for charging storage battery 8, so that storage battery 8 is charged. On the other hand, when the commercial AC power supply fails, control device 10 stops converter 3 based on the power failure signal from power failure detection circuit 33. In addition, control device 10 operates DC voltage converter 7 such that DC power is supplied from storage battery 8 to three-level PWM inverter 4, thus causing three-level PWM inverter 4 to continue supply of AC power. Here, DC voltage converter 7 converts the voltage of storage battery 8 into a voltage suitable as an input voltage for three-level PWM inverter 4. Thus, AC power can be supplied to an AC load in a stable manner.

Figure 2:
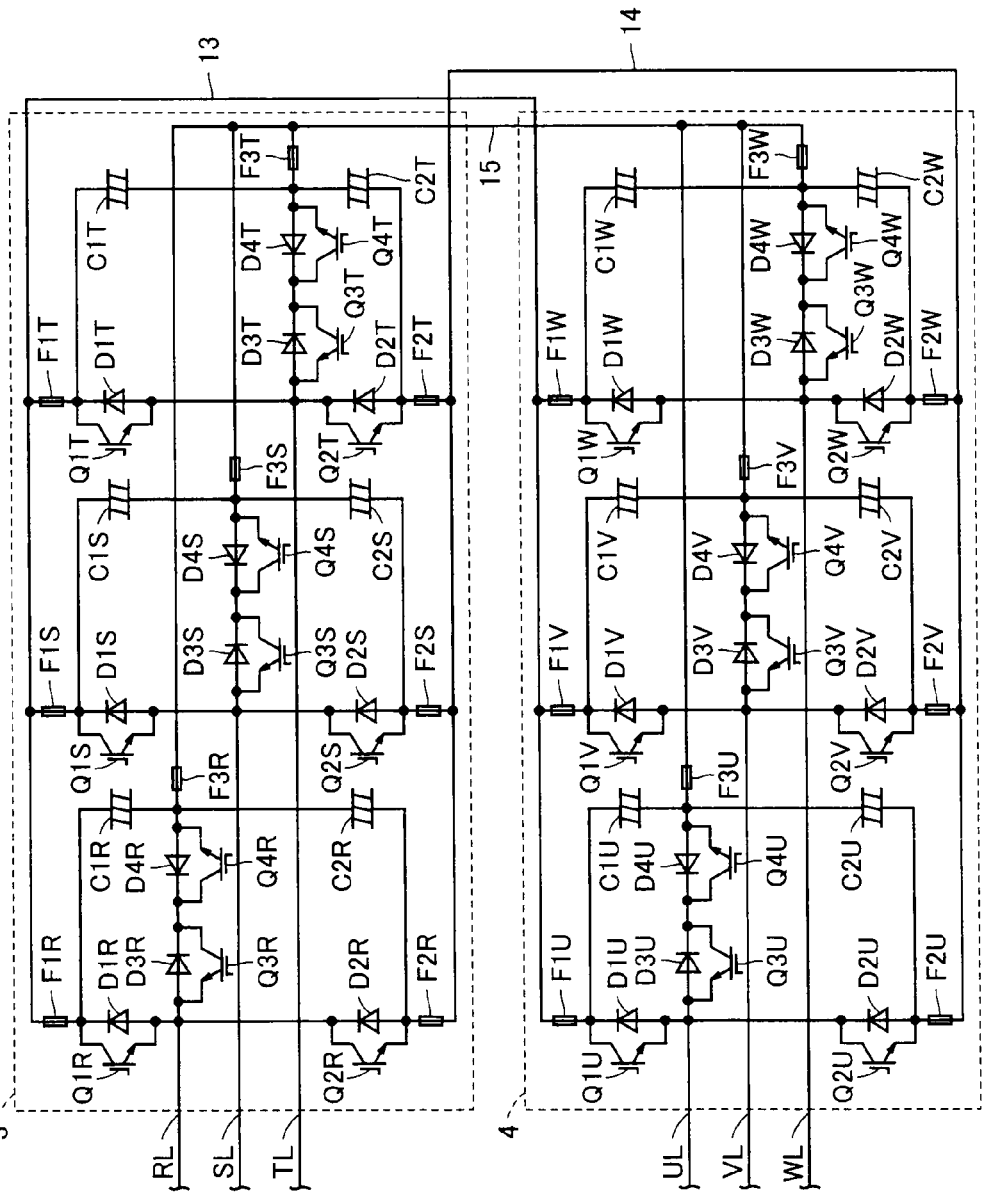
FIG. 2 is a circuit diagram illustrating in detail a configuration of a three-level PWM converter and a three-level PWM inverter shown in FIG. 1.

FIG. 2 is a circuit diagram illustrating in detail a configuration of three-level PWM converter 3 and three-level PWM inverter 4 shown in FIG. 1. Referring to FIG. 2, three-level PWM converter 3 includes IGBT elements Q1R to Q4R, Q1S to Q4S, and Q1T to Q4T, diodes D1R to D4R, D1S to D4S, and D1T to D4T, fuses F1R to F3R, F1S to F3S, and F1T to F3T, and capacitors C1R, C2R, C1S, C2S, C1T, and C2T. Three-level PWM inverter 4 includes IGBT elements Q1U to Q4U, Q1V to Q4V, and Q1W to Q4W, diodes D1I to D4U, D1V to D4V, and D1W to D4W, fuses HU to F3U, F1V to F3V, and F1W to F3W, and capacitors C1U, C2U, C1V, C2V, C1W, and C2W.

Here, in order to collectively describe a configuration of each phase of three-level PWM converter 3 and three-level PWM inverter 4, reference characters R, S, T, U, V, and W are collectively denoted as a reference character "x". IGBT element Q1x has an emitter connected to an x-phase line xL and a collector connected to DC positive bus 13 through fuse F1x. IGBT element Q2x has a collector connected to x-phase line xL, and an emitter connected to DC negative bus 14 through fuse F2x. IGBT element Q3x has an emitter connected to x-phase line xL and a collector connected to a collector of IGBT Q4x. IGBT element Q4x has an emitter connected to DC neutral point bus 15 through a fuse F3x. Diodes D1x to D4x are connected in anti-parallel to IGBT elements Q1x to Q4x respectively. Diodes D1x and D2x function as freewheeling diodes, and diodes D3x and D4x function as clamp diodes. IGBT elements Q3x and Q4x and diodes D3x and D4x constitute an AC switch.

Figure 3:
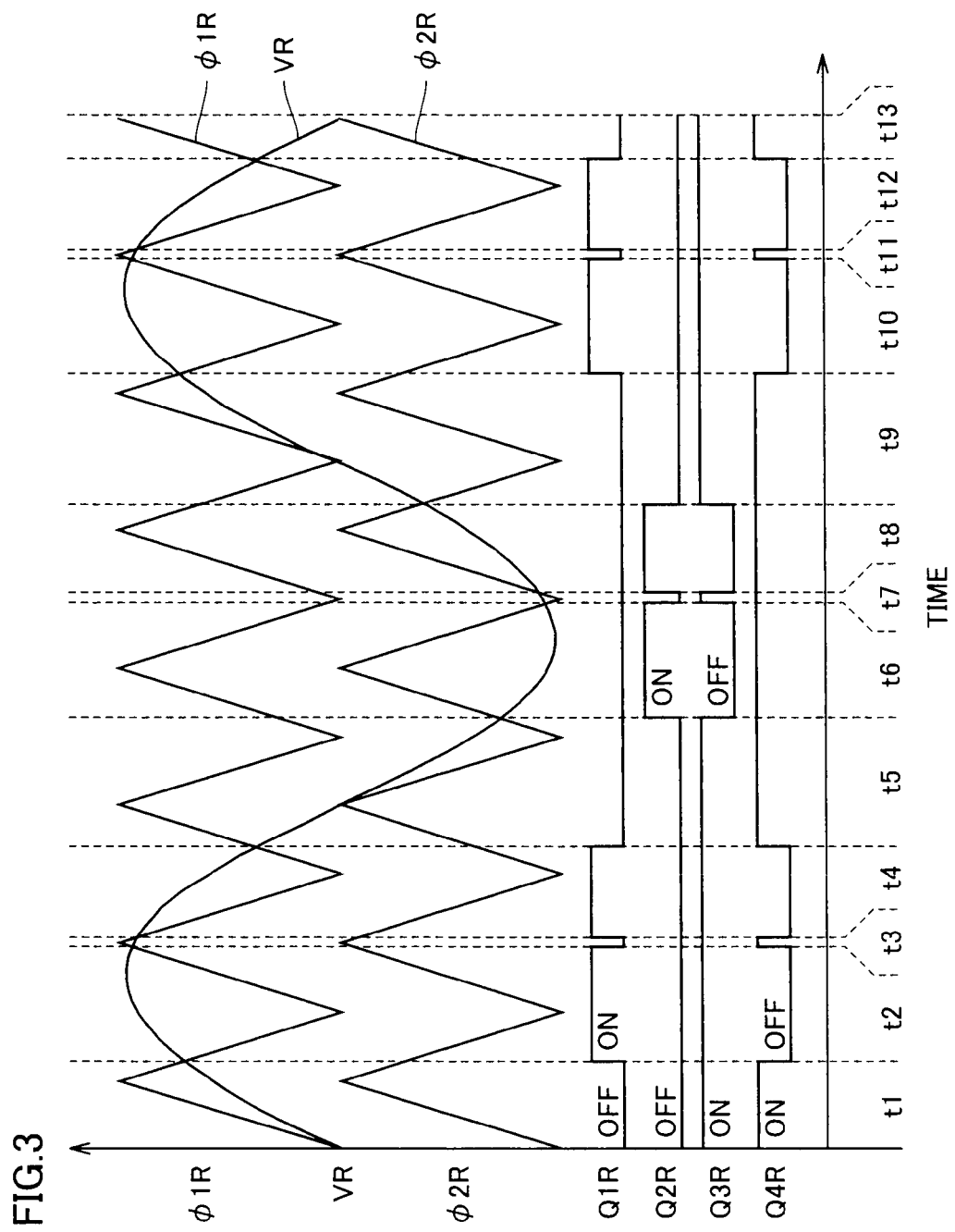
FIG. 3 is a waveform diagram for illustrating timing of ON/OFF of an IGBT element shown in FIG. 2.

Operations of three-level PWM converter 3 and three-level PWM inverter 4 will now be described. FIG. 3 is a waveform diagram showing relation between AC voltage VR of R-phase and ON/OFF of IGBT elements QIR to Q4R. AC voltage VR and reference signals φ1R and φ2R are compared with one another in terms of magnitude, and combination of ON/OFF of IGBT elements QIR to Q4R is determined based on a result of comparison. Reference signal φ1R has a frequency five times as high as AC voltage VR, and it is a triangular wave signal in synchronization with AC voltage VR. A lowest value of reference signal φ1R is 0V, and a highest value thereof is equal to a positive peak voltage of AC voltage VR. Reference signal φ2R is a triangular wave signal in phase with reference signal φ1R. A lowest value of reference signal φ2R is a negative peak voltage of AC voltage VR, and a highest value thereof is 0V.

During a period in which a level of AC voltage VR is intermediate between levels of reference signals φ1R and φ2R (t1, t3, t5, t7, t9, t11, t13), IGBT elements Q3R and Q4R are turned on and IGBT elements Q1R and Q2R are turned off. During a period in which a level of AC voltage VR is higher than the levels of reference signals φ1R and φ2R (t2, t4, t10, t12), IGBT elements Q1R and Q3R are turned on and IGBT elements Q2R and Q4R are turned off. During a period in which a level of AC voltage VR is lower than the levels of reference signals φ1R and φ2R (t6, t8), IGBT elements Q2R and Q4R are turned on and IGBT elements Q1R and Q3R are turned off.

Actually, for example, during a period in which IGBT element Q1R is turned on (such as t2) as well, IGBT element Q1R is turned ON/OFF at a frequency sufficiently higher than AC voltage VR (such as 10 kHz), and a ratio between the ON period and the OFF period is controlled based on a result of measurement by ammeters 32 and 37 and voltmeters 31 and 36. During a period in which IGBT element Q1R is turned off (such as t1), IGBT element Q1R is fixed to the OFF state. Circuits of other phases of S, T, U, V, and W are also merely different in phase from the R-phase, and they operate similarly to the circuit of the R-phase.

Figure 4:
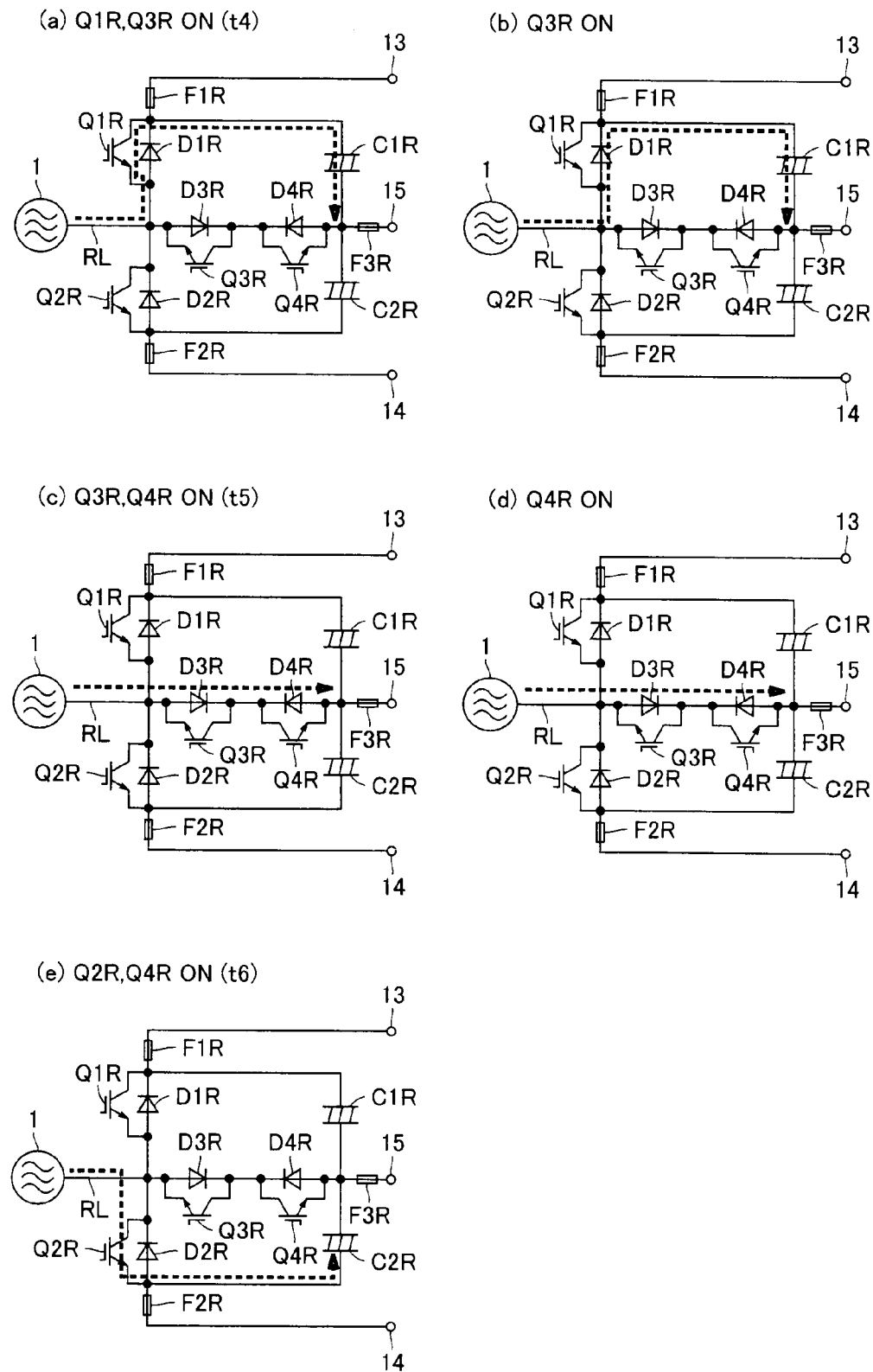
FIG. 4 is a circuit diagram showing an operation of the three-level PWM converter shown in FIG. 2.

FIGS. 4(a) to 4(e) are diagrams showing ON/OFF states of IGBT elements Q1R to Q4R during a period from t4 to t6 in which AC voltage VR varies from a positive voltage to a negative voltage and a current path. During period t4, as shown in FIG. 4(a), IGBT elements Q1R and Q3R are turned on, a positive current flows into capacitor C1R from R-phase line RL through IGBT element Q1R, and DC positive bus 13 is charged to the positive voltage. During a period in which transition from period t4 to t5 is made, as shown in FIG. 4(b), IGBT element Q1R is turned off and IGBT element Q3R alone is turned on.

During period t5, as shown in FIG. 4(c), IGBT elements Q3R and Q4R are turned on, positive and negative currents flow into capacitors C1R and C2R from R-phase line RL through IGBT elements Q3R and Q4R, and DC neutral point bus 15 is charged to the neutral point voltage. During a period in which transition from period t5 to t6 is made, as shown in FIG. 4(d), IGBT element Q3R is turned off and IGBT element Q4R alone is turned on.

During period t6, as shown in FIG. 4(e), IGBT elements Q2R and Q4R are turned on, a negative current flows into capacitor C2R from R-phase line RL through IGBT element Q2R, and DC negative bus 14 is charged to the negative voltage.

Figure 5:
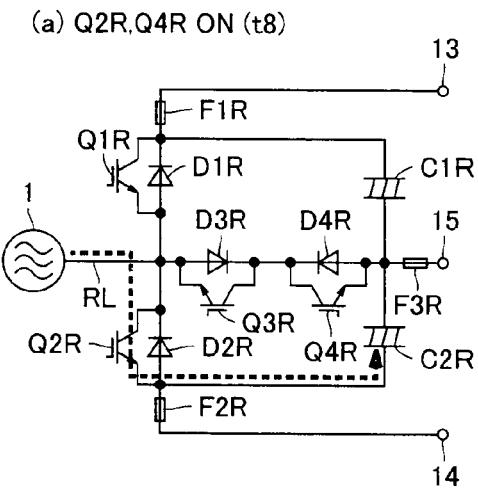
FIG. 5 is another circuit diagram showing an operation of the three-level PWM converter shown in FIG. 2.
Figure 5:
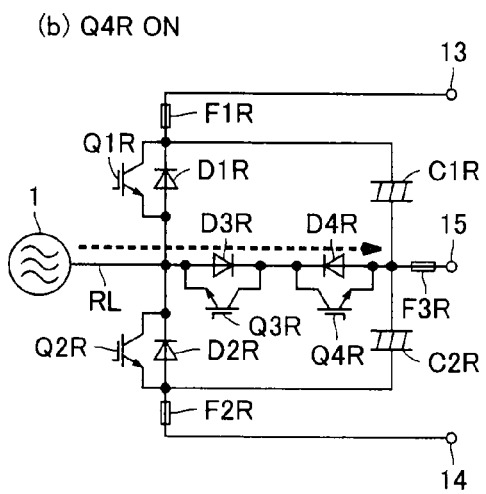
Figure 5:
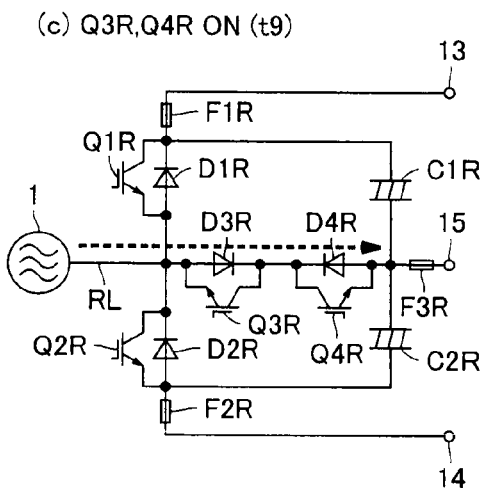
Figure 5:
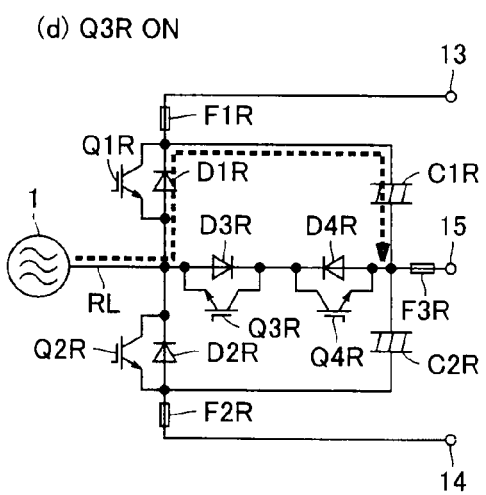
Figure 5:
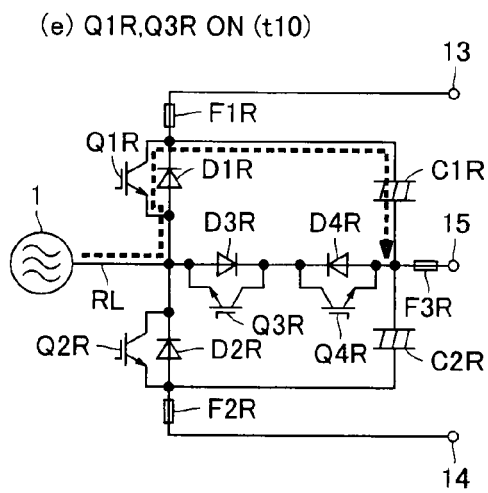

FIGS. 5(a) to 5(e) are diagrams showing ON/OFF states of IGBT elements Q1R to Q4R during a period from t8 to t10 in which AC voltage VR varies from a negative voltage to a positive voltage and a current path. During period t8, as shown in FIG. 5(a), IGBT elements Q2R and Q4R are turned on, a negative current flows into capacitor C2R from R-phase line RL through IGBT element Q2R, and DC negative bus 14 is charged to the negative voltage. During a period in which transition from period t8 to t9 is made, as shown in FIG. 5(b), IGBT element Q2R is turned off and IGBT element Q3R alone is turned on.

During period t9, as shown in FIG. 5(c), IGBT elements Q3R and Q4R are turned on, negative and positive currents flow into capacitors C1R and C2R from R-phase line RL through IGBT elements Q3R and Q4R, and DC neutral point bus 15 is charged to the neutral point voltage. During a period in which transition from period t9 to t10 is made, as shown in FIG. 5(d), IGBT element Q4R is turned off and IGBT element Q3R alone is turned on.

During period t10, as shown in FIG. 5(e), IGBT elements Q1R and Q3R are turned on, a positive current flows into capacitor C1R from R-phase line RL through IGBT element Q1R, and DC positive bus 13 is charged to the positive voltage.

IGBT elements Q1S to Q4S and Q1T to Q4T are also merely different in phase from IGBT elements Q1R to Q4R, and they operate similarly to IGBT elements Q1R to Q4R. Therefore, DC positive bus 13, DC negative bus 14, and DC neutral point bus 15 are charged to the DC positive voltage, the DC negative voltage, and the DC neutral point voltage respectively, by three-level PWM converter 3.

Figure 6:
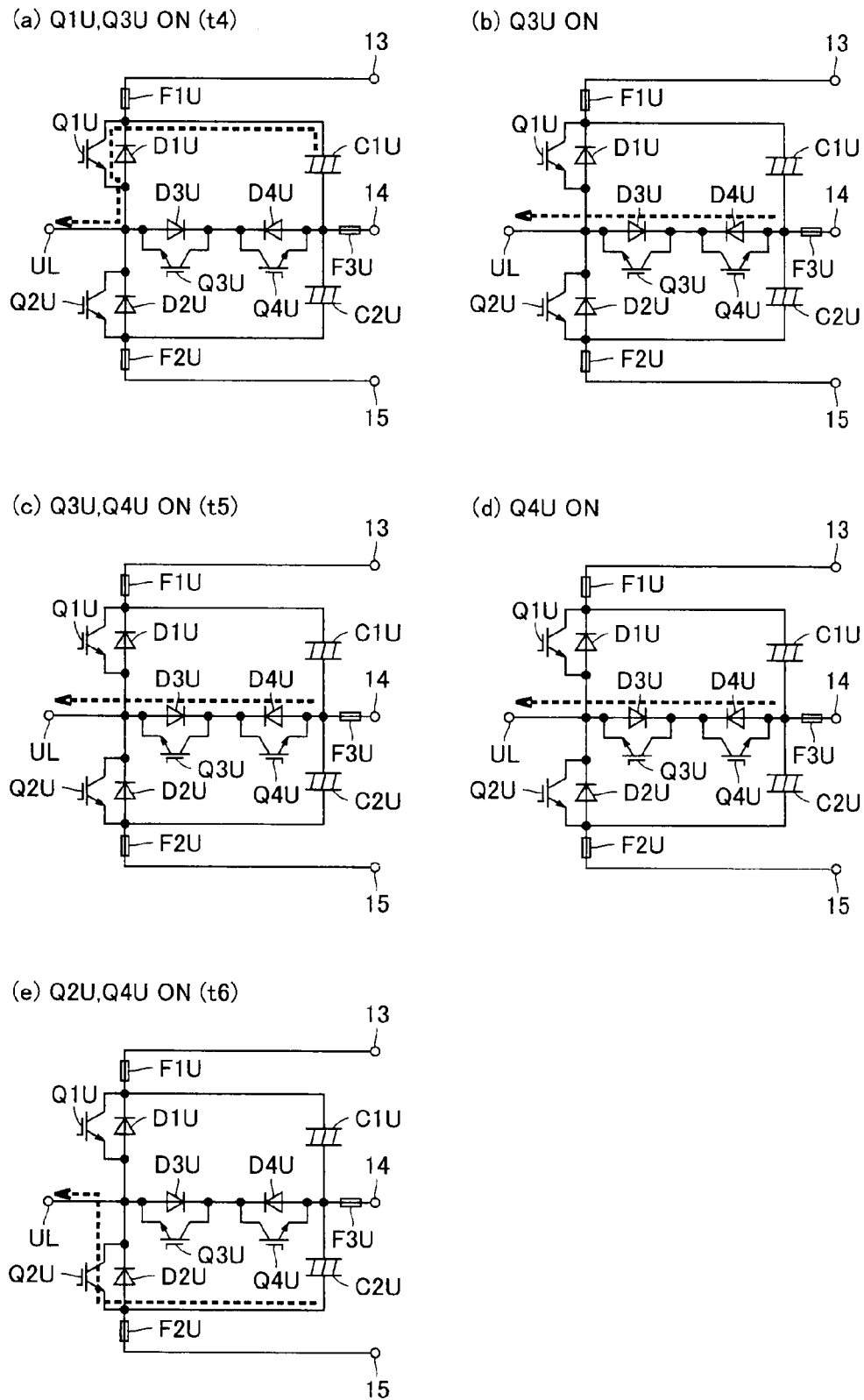
FIG. 6 is a circuit diagram showing an operation of the three-level PWM inverter shown in FIG. 2.

In addition, FIGS. 6(a) to 6(e) are diagrams showing ON/OFF states of IGBT elements Q1U to Q4U during the period from t4 to t6 in which AC voltage VR varies from a positive voltage to a negative voltage and a current path. During period t4, as shown in FIG. 6(a), IGBT elements Q1U and Q3U are turned on, and a positive voltage is output to U-phase line UL from capacitor C1U through IGBT element Q1U. During the period in which transition from period t4 to t5 is made, as shown in FIG. 6(b), IGBT element Q1U is turned off and IGBT element Q3U alone is turned on.

During period t5, as shown in FIG. 6(c), IGBT elements Q3U and Q4U are turned on, and the neutral point voltage is output to U-phase line UL from capacitors C1U and C2U through IGBT elements Q3U and Q4U. During the period in which transition from period t5 to t6 is made, as shown in FIG. 6(d), IGBT element Q3U is turned off and IGBT element Q4U alone is turned on. During period t6, as shown in FIG. 6(e), IGBT elements Q2U and Q4U are turned on, and a negative voltage is output to U-phase line UL from capacitor C2U through IGBT element Q2U.

Figure 7:
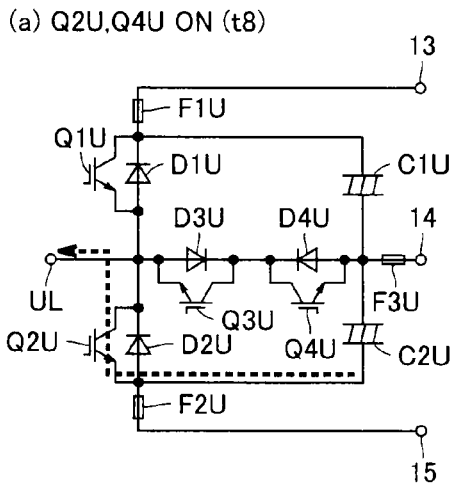
FIG. 7 is another circuit diagram showing an operation of the three-level PWM inverter shown in FIG. 2.
Figure 7:
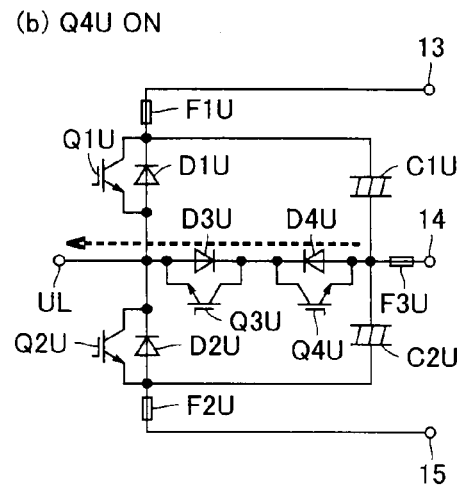
Figure 7:
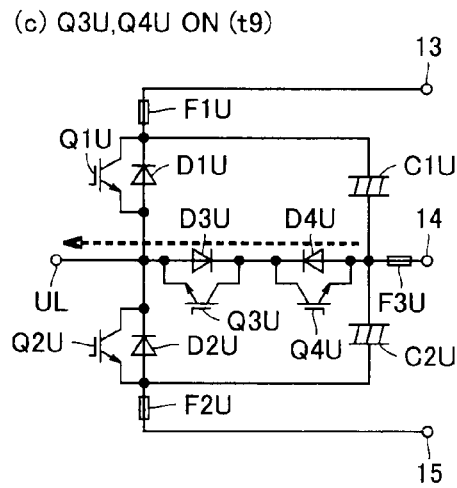
Figure 7:
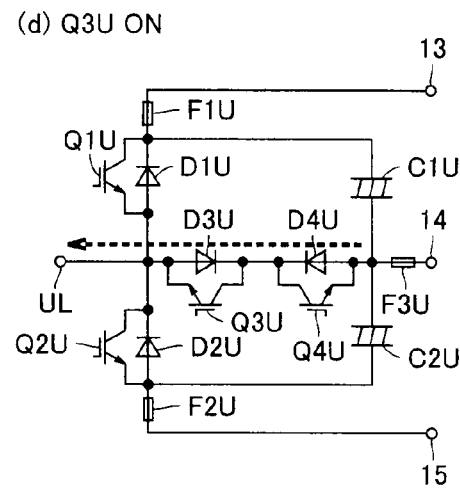
Figure 7:
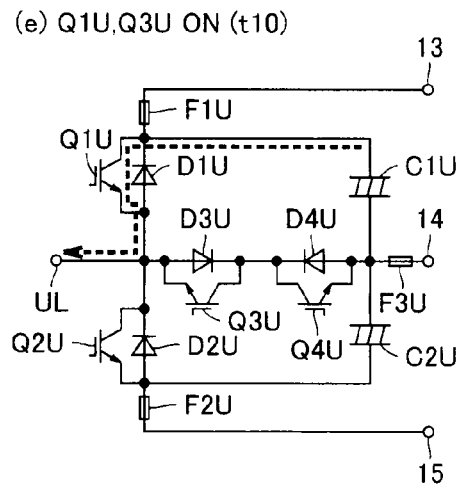

FIGS. 7(a) to 7(e) are diagrams showing ON/OFF states of IGBT elements Q1U to Q4U during the period from t8 to t10 in which AC voltage VR varies from a negative voltage to a positive voltage and a current path. During period t8, as shown in FIG. 7(a), IGBT elements Q2U and Q4U are turned on, and a negative voltage is output to U-phase line UL from capacitor C2U through IGBT element Q2U. During the period in which transition from period t8 to t9 is made, as shown in FIG. 7(b), IGBT element Q2U is turned off and IGBT element Q4U alone is turned on.

During period t9, as shown in FIG. 7(c), IGBT elements Q3U and Q4U are turned on, and the neutral point voltage is output to U-phase line UL from capacitors C1U and C2U through IGBT elements Q3U and Q4U. During the period in which transition from period t9 to t10 is made, as shown in FIG. 7(d), IGBT element Q4U is turned off and IGBT element Q3U alone is turned on. During period t10, as shown in FIG. 7(e), IGBT elements Q1U and Q3U are turned on, and a positive voltage is output to U-phase line UL from capacitor C1U through IGBT element Q1U.

IGBT elements Q1V to Q4V and Q1W to Q4W are also merely different in phase from IGBT elements Q1U to Q4U, and they operate similarly to IGBT elements Q1U to Q4U. Therefore, three-phase AC voltages of three levels are output to U-phase line UL, V-phase line VL and W-phase line WL by three-level PWM inverter 4, respectively.

Figure 8:
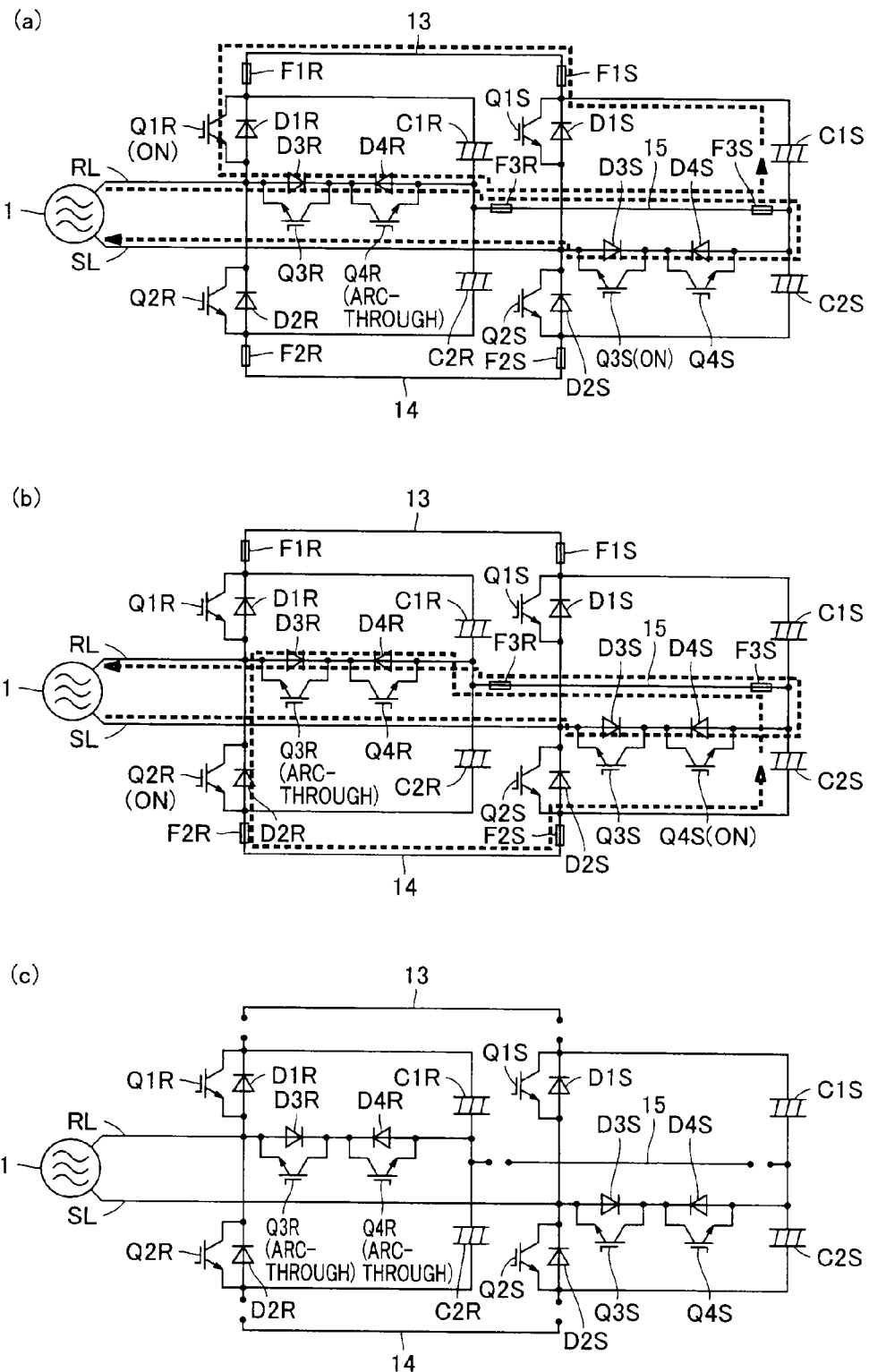
FIG. 8 is a circuit diagram showing how a fuse shown in FIG. 2 works.

How fuses F1R to F3R, F1S to F3S, F1T to F3T, H1U to F3U, F1V to F3V, and F1W to F3W work will now be described. FIG. 8(a) is a diagram showing an example where IGBT element Q4R fails and an arc-through state is established during a period in which IGBT elements Q1R and Q3S are turned on. Here, a short-circuit current flows through a path from R-phase line RL through diode D3R, IGBT element Q4R, fuses F3R and F3S, diode D4S, and IGBT elements Q3S to S-phase line SL, and fuses F3R and F3S are blown. In addition, a short-circuit current flows through a path from a positive electrode of capacitor C1S through fuses F1S and F1R, IGBT element Q1R, diode D3R, IGBT elements Q4R, and fuses F3R and F3S to a negative electrode of capacitor C1S, and fuses F1S, F1R, F3R, and F3S are blown.

In addition, FIG. 8(b) is a diagram showing an example where IGBT element Q3R fails and an arc-through state is established during a period in which IGBT elements Q2R and Q4S are turned on. Here, a short-circuit current flows through a path from S-phase line SL through diode D3S, IGBT element Q4S, fuses F3S and F3R, diode D4R, and IGBT element Q3R to R-phase line RL, and fuses F3R and F3S are blown. Moreover, a short-circuit current flows through a path from a positive electrode of capacitor C2S through fuses F3S and F3R, diode D4R, IGBT elements Q3R and Q2R, and fuses F2R and F2S to a negative electrode of capacitor C2S, and fuses F2R, F3R, F2S, and F3S are blown.

Thus, as shown in FIG. 8(c), when all fuses F1R to F3R and F1S to F3S are blown, the R-phase and the S-phase are completely disconnected from each other, and flow of an overcurrent or generation of an overvoltage is prevented. For example, normally, a voltage across R-phase lines RL and SL is applied to two capacitors C1R and C2R connected in series. As shown in FIG. 8(c), however, when IGBT elements Q3R and Q4R are in the arc-through state, unless fuses F1R to F3R and F1S to F3S are blown, the voltage across R-phase lines RL and SL is applied to one of capacitors C1R and C2R and capacitor C1R or C2R is overcharged to a level √2 times as high as a normal level. According to the invention of the subject application, however, as fuses F1R to F3R and F1S to F3S are blown, capacitors C1R and C2R are not overcharged. Though description in connection with FIGS. 8(a) to 8(c) is provided with reference to the R-phase and the S-phase by way of example, the above description is also applicable to other phases (the T-phase, the U-phase, the V-phase, and the W-phase).

Figure 9:
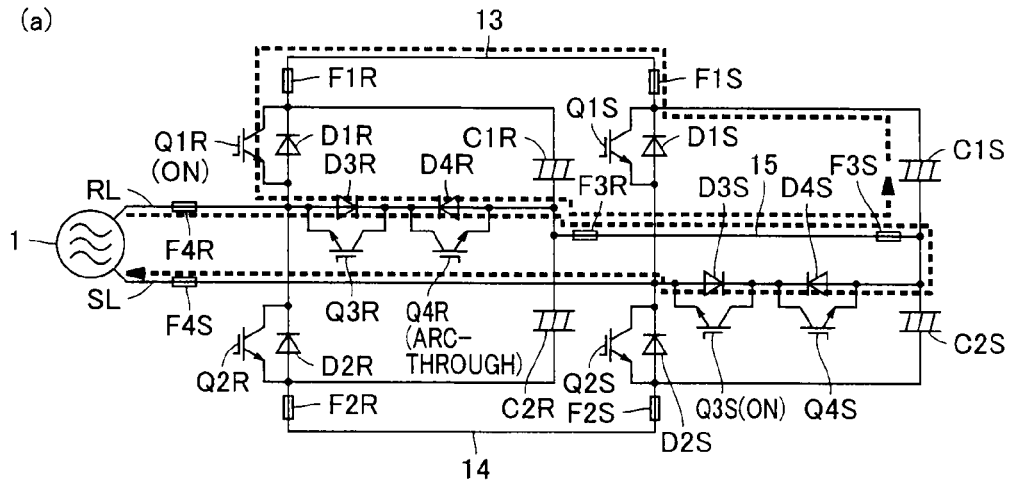
FIG. 9 is a circuit diagram showing a modification of the embodiment.
Figure 9:
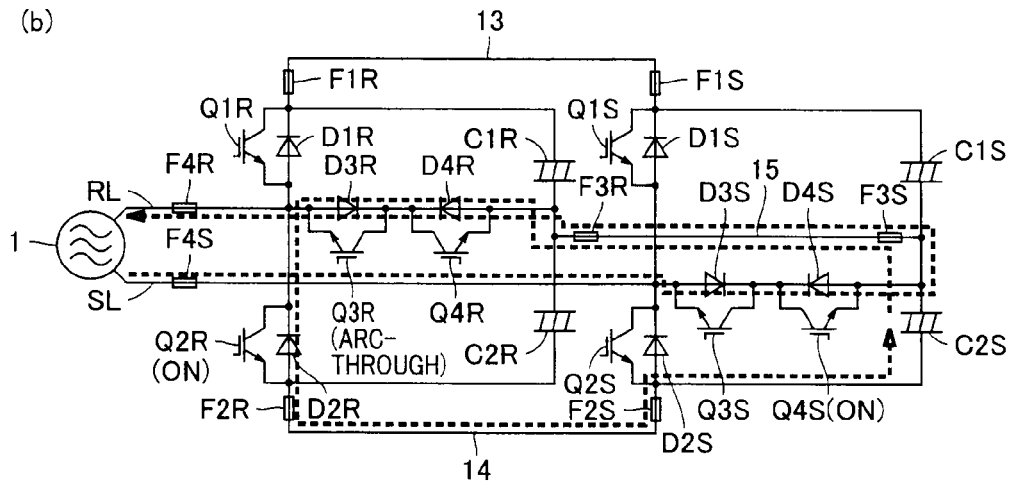
Figure 9:
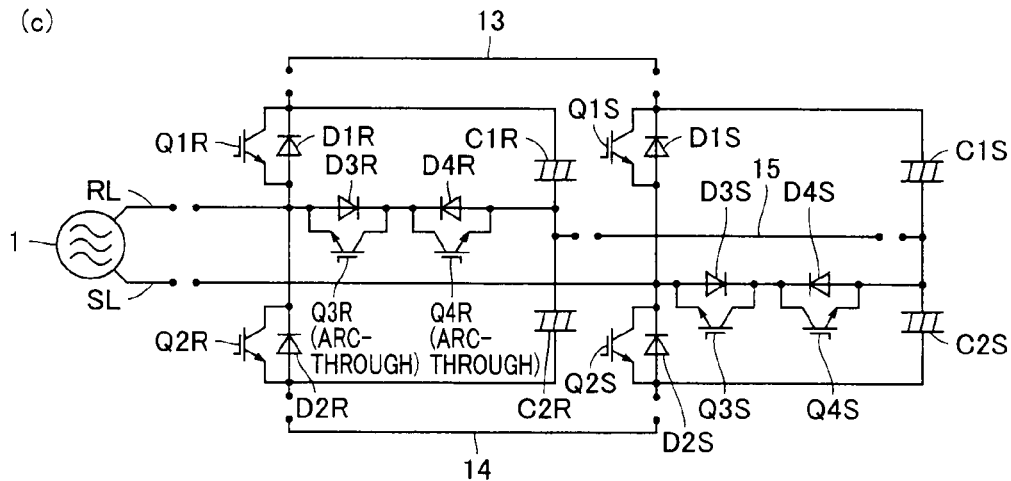

Various modifications of the present embodiment will be described hereinafter. FIGS. 9(a) to 9(c) are circuit diagrams showing modifications of the present embodiment, to be compared with FIGS. 8(a) to 8(c). In the present modification, a fuse F4x is interposed between x-phase line xL and a connection node between IGBT elements Q1x and Q2x. FIGS. 9(a) to 9(c) show a state that a fuse F4R is interposed between R-phase line RL and a connection node between IGBT elements Q1R and Q2R, and a fuse F4S is interposed between S-phase line SL and a connection node between IGBT elements Q1S and Q2S. When IGBT element Q3R or Q4R is in the arc-through state during a period in which IGBT element Q4S is turned on, a short-circuit current flows and fuses F3R, F4R, F3S, and F4S are blown. According to this modification as well, an effect the same as in the embodiment is obtained.

Figure 10:
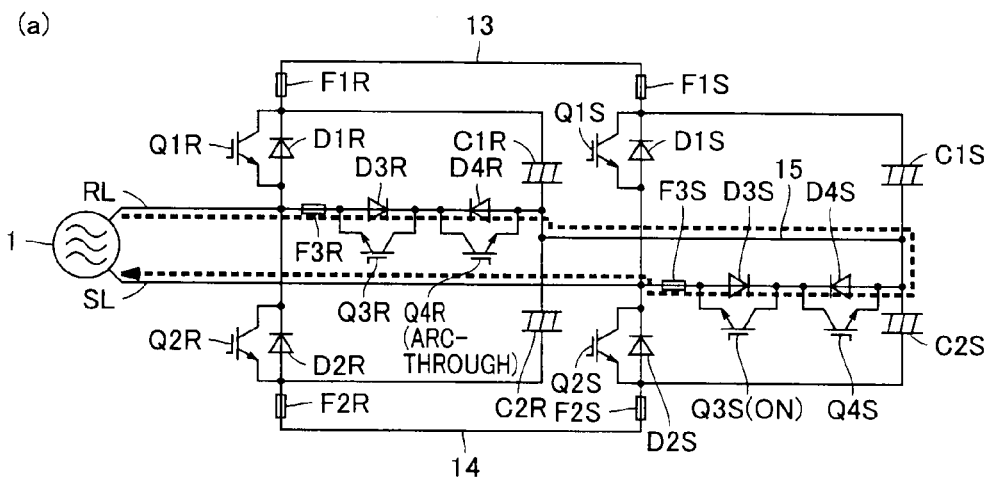
FIG. 10 is a circuit diagram showing another modification of the embodiment.
Figure 10:
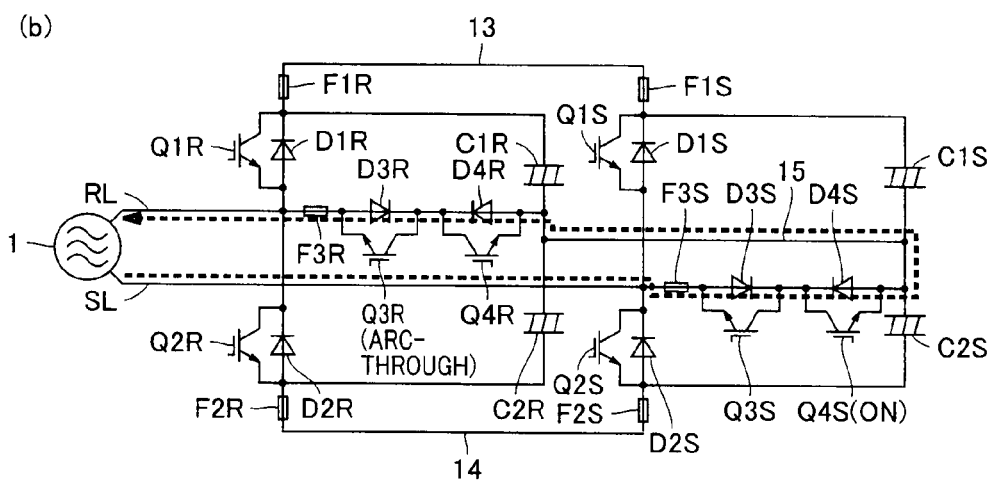
Figure 10:
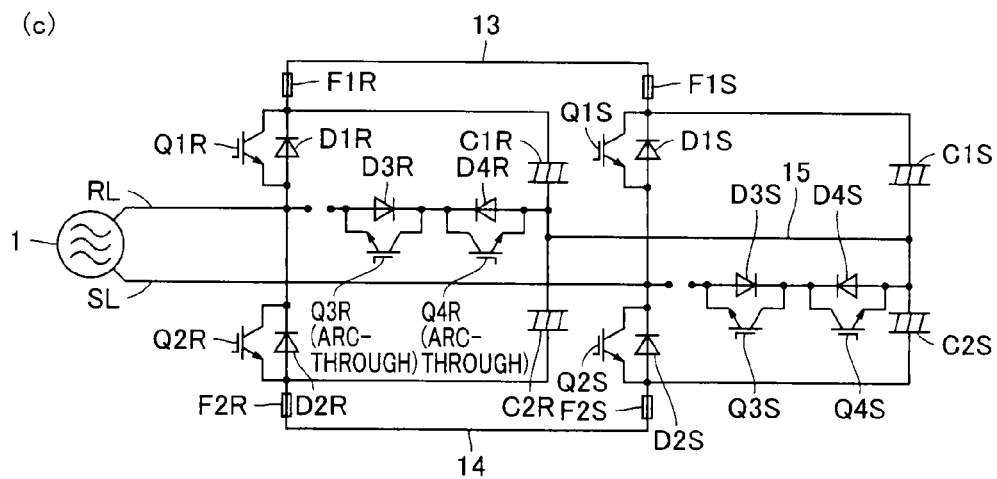

In addition, FIGS. 10(a) to 10(c) are circuit diagrams showing other modifications of the present embodiment, to be compared with FIGS. 8(a) to 8(c). In the present modification, fuse F3x is interposed between the connection node between IGBT elements Q1x and Q2x and the emitter of IGBT element F3x, instead of between a connection node between capacitors C1x and C2x and DC neutral point bus 15. FIGS. 10(a) to 10(c) show a state that fuse F3R is interposed between the connection node between IGBT elements Q1R and Q2R and the emitter of IGBT element F3R, and fuse F3S is interposed between the connection node between IGBT elements Q1S and Q2S and the emitter of IGBT element F3S. When IGBT element Q3R or Q4R is in the arc-through state during a period in which IGBT element Q4S is turned on, a short-circuit current flows and fuses F3R and F3S are blown. According to this modification as well, an effect the same as in the embodiment is obtained. It is noted that an inductance of fuse F3x disadvantageously increases, because an AC current flows through fuse F3x.

Figure 11:
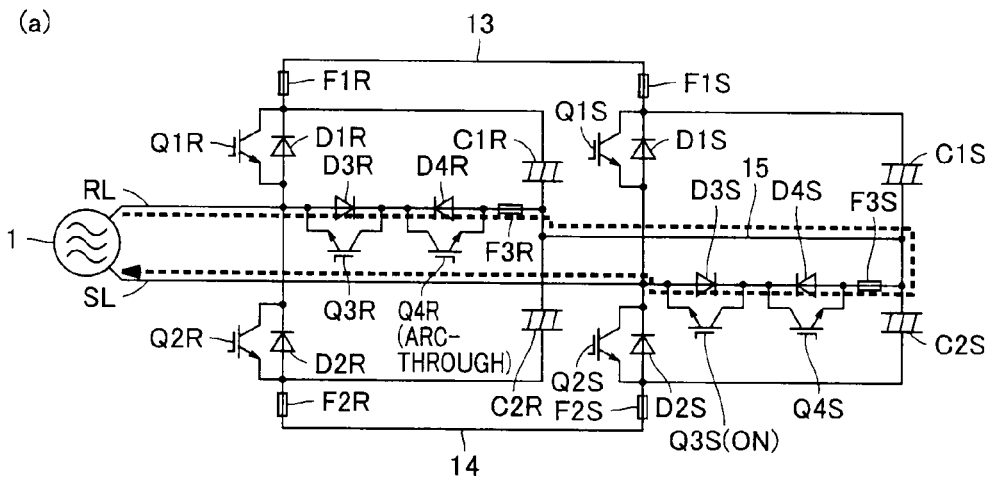
FIG. 11 is a circuit diagram showing yet another modification of the embodiment.
Figure 11:
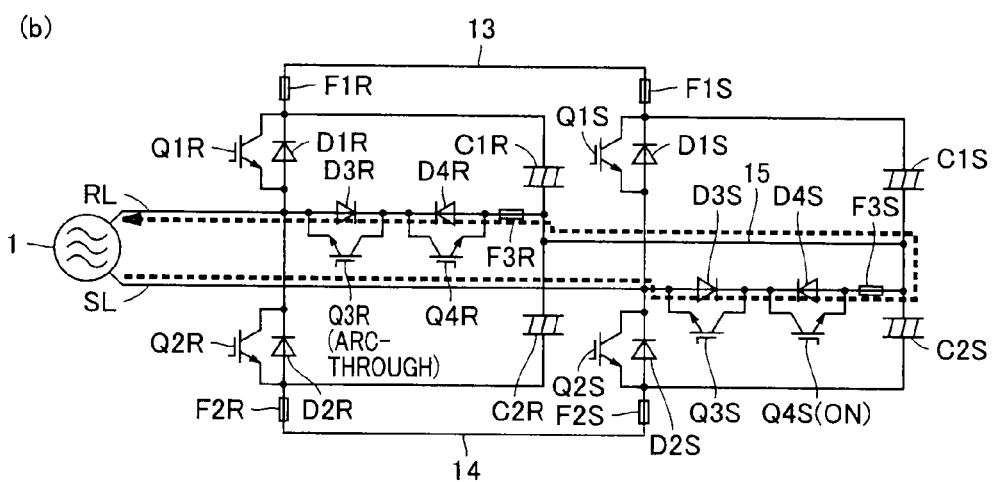
Figure 11:
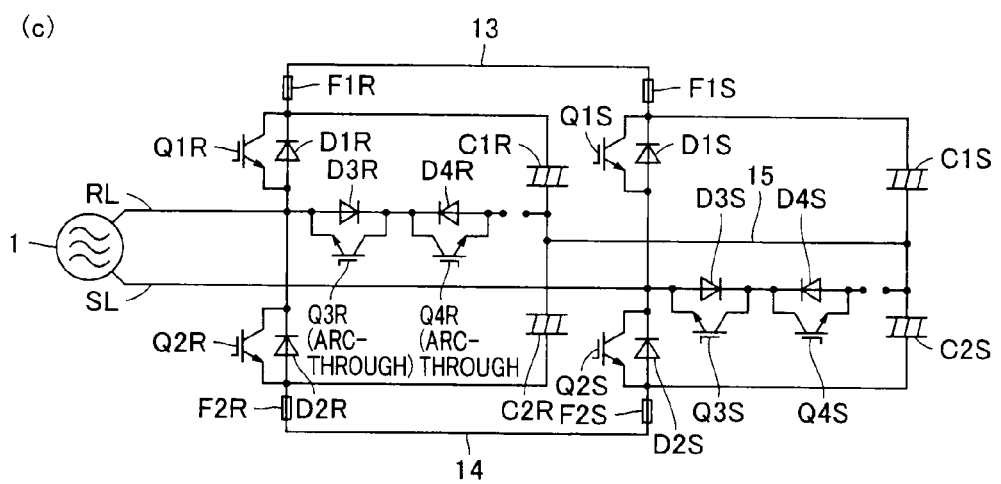

Moreover, FIGS. 11(a) to 11(c) are circuit diagrams showing still other modifications of the present embodiment, to be compared with FIGS. 8(a) to 8(c). In the present modification, fuse F3x is interposed between the emitter of IGBT element Q4x and the connection node between capacitors C1x and C2x, instead of between the connection node between capacitors C1x and C2x and DC neutral point bus 15. FIGS. 11(a) to 11(c) show a state that fuse F3R is interposed between the emitter of IGBT element Q4R and the connection node between capacitors C1R and C2R, and fuse F3S is interposed between the emitter of IGBT element Q4S and the connection node between capacitors C1S and C2S. When IGBT element Q3R or Q4R is in the arc-through state during a period in which IGBT element Q4S is turned on, a short-circuit current flows and fuses F3R and F3S are blown. According to this modification as well, an effect the same as in the embodiment is obtained. It is noted that an inductance of fuse F3x disadvantageously increases, because an AC current flows through fuse F3x.

Figure 12:
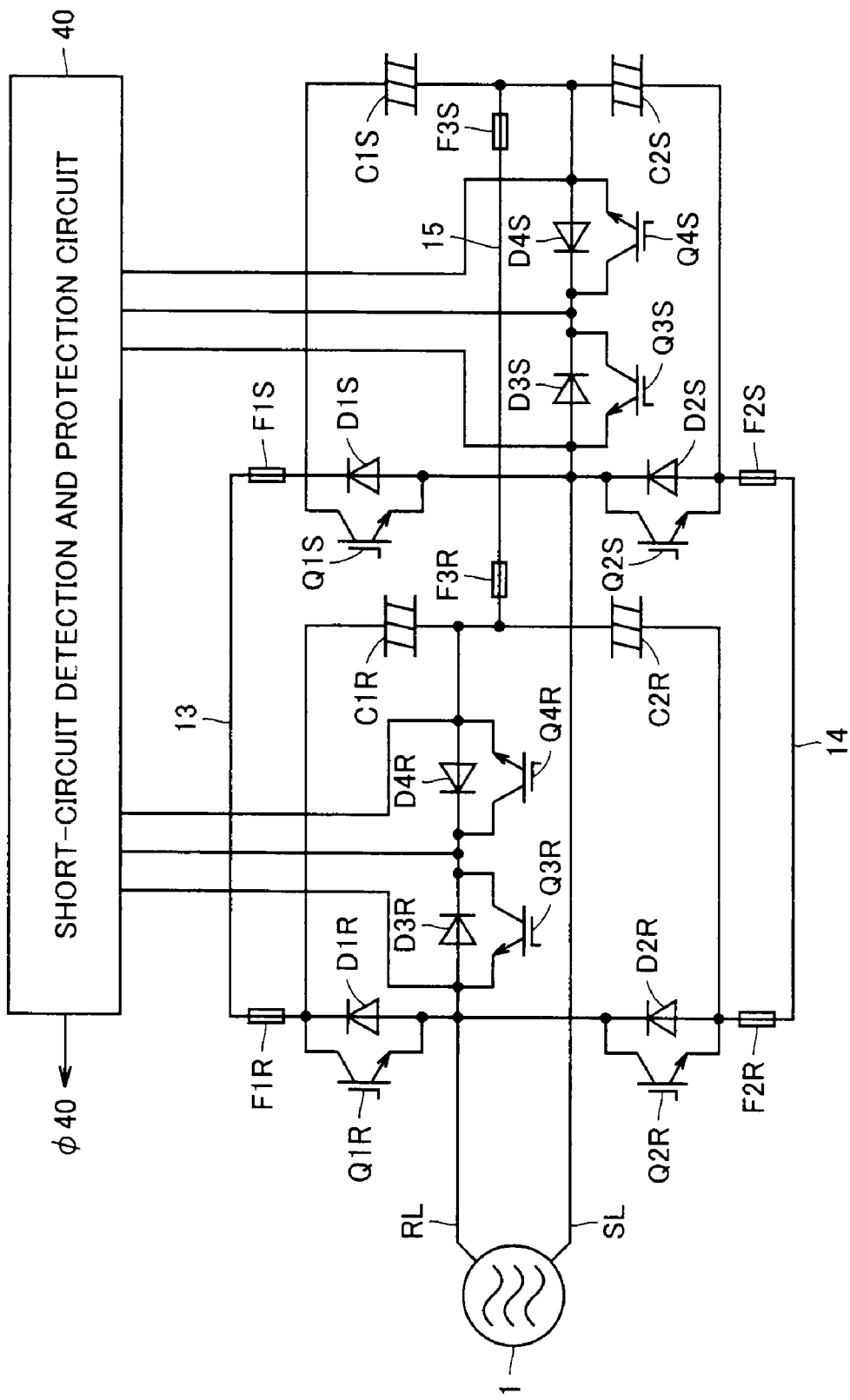
FIG. 12 is a circuit diagram showing yet another modification of the embodiment.

Further, FIG. 12 is a circuit diagram showing yet another modification of the present embodiment, to be compared with FIG. 8(a). In the present modification, a short-circuit detection and protection circuit 40 is added. Short-circuit detection and protection circuit 40 monitors a voltage across the collector and the emitter of each of IGBT elements Q3x and Q4x and detects whether IGBT element Q3x or Q4x has failed and short circuit (arc-through) has occurred or not. FIG. 12 shows a state that short-circuit detection and protection circuit 40 monitors the voltage across the collector and the emitter of each of IGBT elements Q3R, Q4R, Q3S, and Q4S.

Short-circuit detection and protection circuit 40 determines that IGBT element Q3x (or Q4x) has failed and short circuit has occurred, for example, when the voltage across the collector and the emitter of IGBT element Q3x (or Q4x) is lower than a prescribed voltage during the OFF period of IGBT element Q3x (or Q4x), and causes a short-circuit detection signal φ40 to rise from the "L" level indicating an inactivated level to the "H" level indicating an activated level. Control circuit 10 in FIG. 1 fixes all IGBT elements Q1x to Q4x to the OFF state in response to rise of short-circuit detection signal φ40 to the "H" level. Thus, the operation of three-level PWM converter 3 and three-level PWM inverter 4 can be stopped before fuses F1x to F3x are blown, and a device can doubly be protected by fuses F1x to F3x and short-circuit detection and protection circuit 40.

Figure 13:
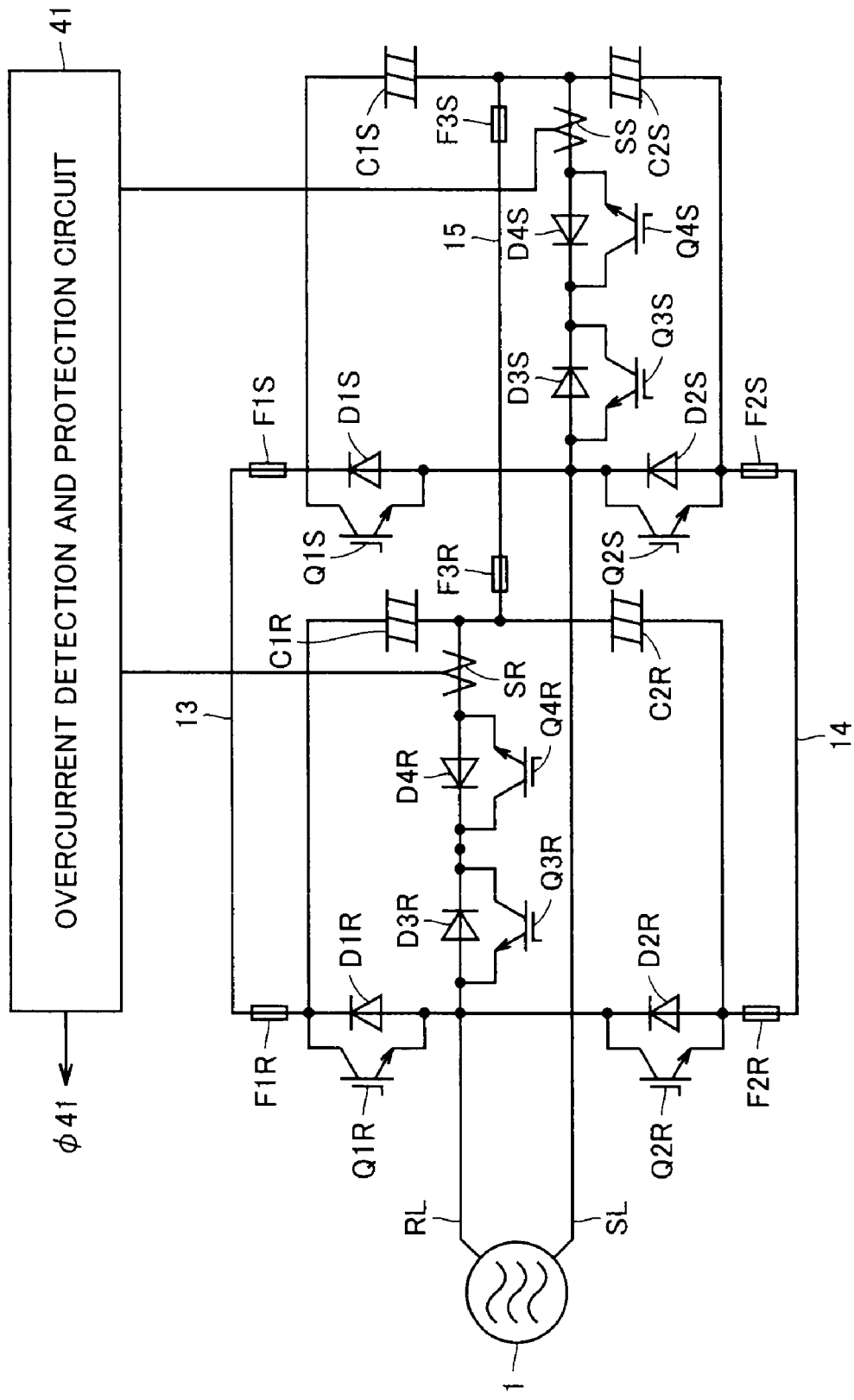
FIG. 13 is a circuit diagram showing yet another modification of the embodiment.

In addition, FIG. 13 is a circuit diagram showing yet another modification of the present embodiment, to be compared with FIG. 8(a). In the present modification, an overcurrent detection and protection circuit 41 and a current sensor Sx are added. Current sensor Sx detects a current that flows through IGBT elements Q3x and Q4x between the connection node between IGBT elements Q1x and Q2x and the connection node between capacitors C1x and C2x, and outputs a signal indicating a detected value. Overcurrent detection and protection circuit 41 monitors a current that flows through IGBT elements Q3x and Q4x based on the output signal from current sensor Sx, and detects whether IGBT element Q3x or Q4x has failed and an overcurrent flows or not. FIG. 13 shows a state that overcurrent detection and protection circuit 41 monitors a current that flows through IGBT elements Q3R and Q4R based on an output signal from a current sensor SR and monitors a current that flows through IGBT elements Q3S and Q4S based on an output signal from a current sensor SS.

When the overcurrent flows through IGBT elements Q3x and Q4x, overcurrent detection and protection circuit 41 causes an overcurrent detection signal φ41 to rise from the "L" level indicating an inactivated level to the "H" level indicating an activated level. Control circuit 10 in FIG. 1 fixes all IGBT elements Q1x to Q4x to the OFF state in response to rise of overcurrent detection signal φ41 to the "H" level. Thus, the operation of three-level PWM converter 3 and three-level PWM inverter 4 can be stopped before fuses F1x to F3x are blown, and a device can doubly be protected by fuses F1x to F3x and overcurrent detection and protection circuit 41.

Figure 14:
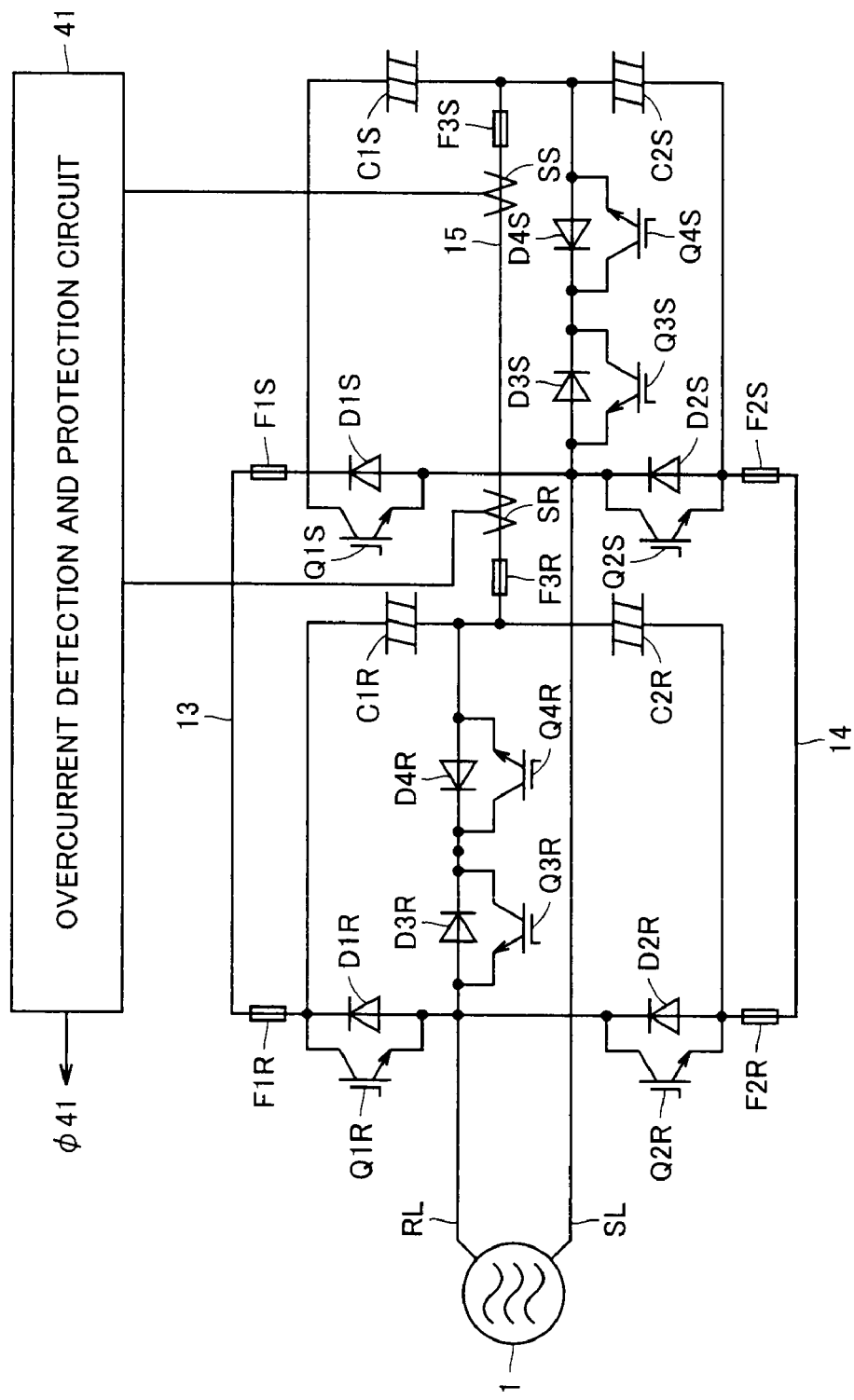
FIG. 14 is a circuit diagram showing yet another modification of the embodiment.

As shown in FIG. 14, current sensor Sx may be arranged in a line between the connection node between capacitors C1x and C2x and DC neutral point bus 15, and current sensor Sx may detect a current that flows through fuse F3x.

In addition, in the present embodiment, an example where the invention of the subject application is applied to a three-level circuit has been described, however, the invention of the subject application is also applicable to a multi-level circuit for conversion between a DC voltage and an AC voltage having at least three voltage values.

Figure 15:
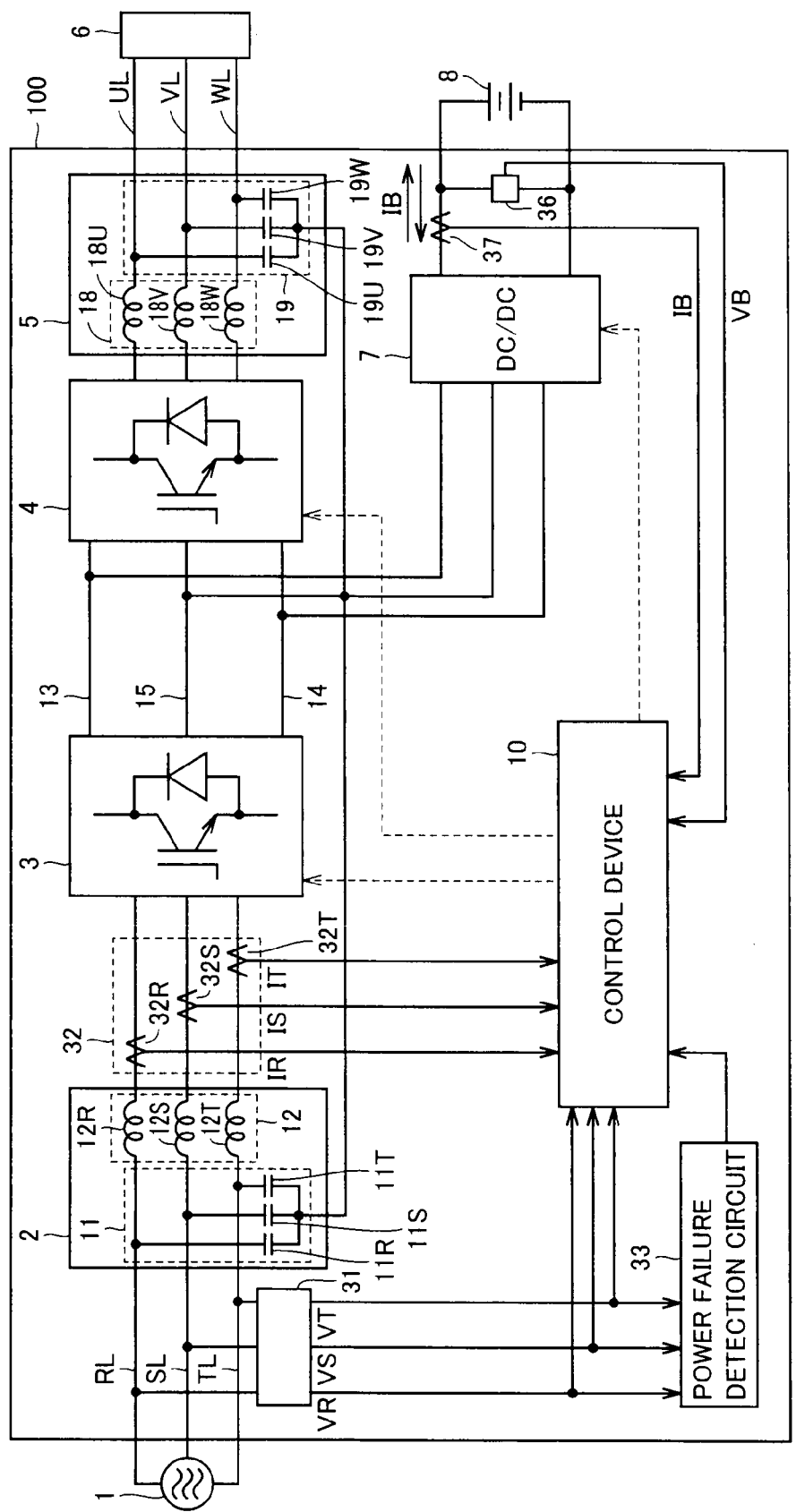
FIG. 15 is a circuit diagram showing yet another modification of the embodiment.

Moreover, in the present embodiment, an uninterruptible power supply system applicable to a three-phase, three-wire system AC power supply and load has been shown, however, the present invention is also applicable to a three-phase, four-wire system AC power supply and load. In the case of the three-phase, four-wire system, as shown in FIG. 15, it is only necessary to connect neutral points of respective capacitors 11 and 19 to DC neutral point bus 15. Further, the AC power supply and the AC load are not limited to those of three phases, and a single-phase power supply or load may be adopted. In that case, two multi-level circuits should only be provided in each of a converter and an inverter.

In addition, in the present embodiment, a DC voltage converter is applied between the storage battery and the DC bus, however, the DC voltage converter can naturally be eliminated so long as the storage battery within a rated operation range of the DC bus can be selected.

Moreover, in the present embodiment, an example where the power conversion device according to the present invention is applied to the uninterruptible power supply system including the storage battery has been described, however, a filter achieving smaller size and lighter weight that includes a multi-level circuit as well as achieving suppression of fluctuation of a potential to ground is applicable to a power conversion device outputting AC power based on DC power, such as a solar power generation system, a fuel cell power generation system, or a secondary battery energy storage system.

Figure 16:
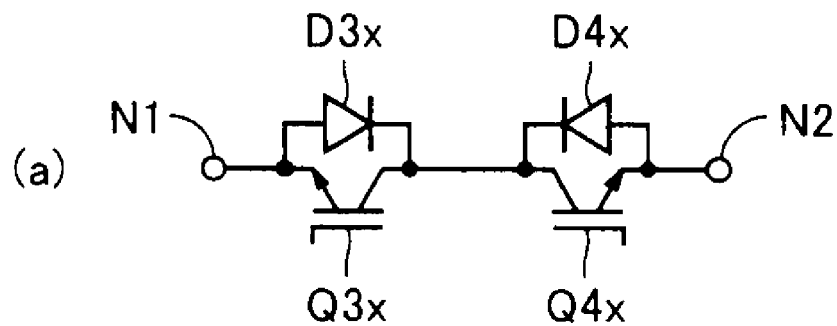
FIG. 16 is a circuit diagram showing yet another modification of the embodiment.
Figure 16:
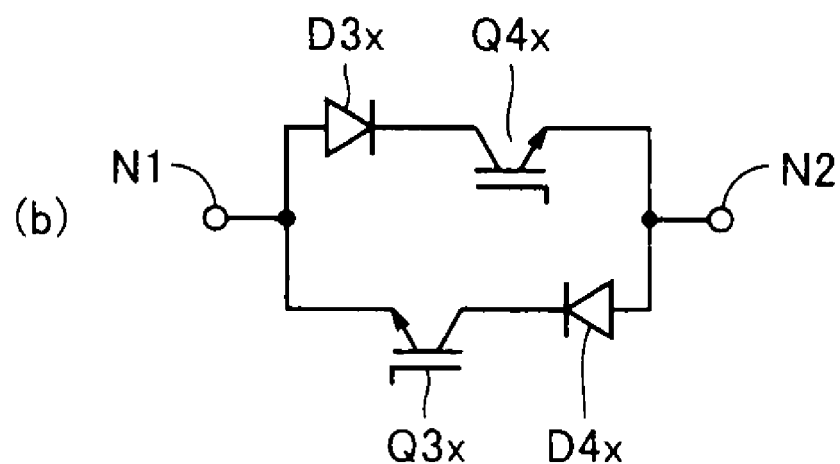
Figure 16:
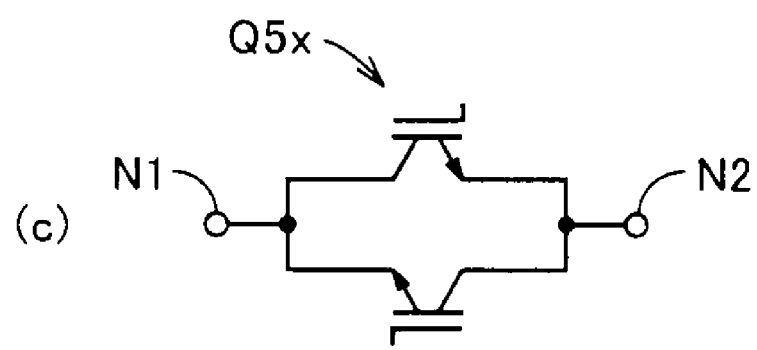

Further, in the present embodiment, a switch including two IGBT elements Q3x and Q4x having emitters connected to each other and two diodes D3x and D4x connected in anti-parallel to IGBT elements Q3x and Q4x respectively is employed as the AC switch, however, a differently configured AC switch as shown in FIGS. 16(a) to 16(c) may be employed.

The AC switch in FIG. 16(a) includes IGBT element Q3x having an emitter connected to a node N1, IGBT element Q4x having a collector connected to a collector of IGBT element Q3x and an emitter connected to a node N2, and two diodes D3x and D4x connected in anti-parallel to IGBT elements Q3x and Q4x respectively. It is noted that node N1 is connected to the connection node between IGBT elements Q1x and Q2x and node N2 is connected between the connection node between capacitors C1x and C2x.

The AC switch in FIG. 16(b) includes diode D3x having an anode connected to node N1, IGBT element Q4x having the collector connected to a cathode of diode D3x and having the emitter connected to node N2, IGBT element Q3x having the emitter connected to node N1, and diode D4x having a cathode connected to the collector of IGBT element Q3x and having an anode connected to node N2. The AC switch in FIG. 16(c) includes a reverse blocking IGBT element Q5x connected between nodes N1 and N2.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power conversion device provided between an AC line, and a DC positive bus, a DC negative bus and a DC neutral point bus, for converting one of DC power and AC power to the other, comprising:

a first fuse having one terminal connected to said DC positive bus;

a second fuse having one terminal connected to said DC negative bus;
a third fuse having one terminal connected to said DC neutral point bus;
a first semiconductor switching element connected between the other terminal of said first fuse and said AC line;
a second semiconductor switching element connected between said AC line and the other terminal of said second fuse;
an AC switch connected between said AC line and the other terminal of said third fuse;
first and second diodes connected in anti-parallel to said first and second semiconductor switching elements, respectively;
a first capacitor connected between the other terminals of said first and third fuses; and
a second capacitor connected between the other terminals of said second and third fuses.

2. A power conversion device provided between an AC line, and a DC positive bus, a DC negative bus and a DC neutral point bus, for converting one of DC power and AC power to the other, comprising:
a first fuse having one terminal connected to said DC positive bus;
a second fuse having one terminal connected to said DC negative bus;
a third fuse having one terminal connected to said AC line;
a first semiconductor switching element connected between the other terminal of said first fuse and said AC line;
a second semiconductor switching element connected between said AC line and the other terminal of said second fuse;
an AC switch connected between the other terminal of said third fuse and said DC neutral point bus;
first and second diodes connected in anti-parallel to said first and second semiconductor switching elements, respectively;
a first capacitor connected between the other terminal of said first fuse and said DC neutral point bus; and
a second capacitor connected between the other terminal of said second fuse and said DC neutral point bus.

3. A power conversion device provided between an AC line, and a DC positive bus, a DC negative bus and a DC neutral point bus, for converting one of DC power and AC power to the other, comprising:
a first fuse having one terminal connected to said DC positive bus;
a second fuse having one terminal connected to said DC negative bus;
a third fuse having one terminal connected to said DC neutral point bus;
a first semiconductor switching element connected between the other terminal of said first fuse and said AC line;
a second semiconductor switching element connected between said AC line and the other terminal of said second fuse;
an AC switch connected between said AC line and the other terminal of said third fuse;
first and second diodes connected in anti-parallel to said first and second semiconductor switching elements, respectively;
a first capacitor connected between the other terminal of said first fuse and said DC neutral point bus; and
a second capacitor connected between the other terminal of said second fuse and said DC neutral point bus.

4. The power conversion device according to any of claims 1 to 3, further comprising a fourth fuse interposed between a connection node between said first and second semiconductor switching elements and said AC line.

5. The power conversion device according to any of claims 1 to 3, wherein
said AC switch includes
third and fourth semiconductor switching elements connected in series, and
third and fourth diodes connected in anti-parallel to said third and fourth semiconductor switching elements, respectively.

6. The power conversion device according to claim 5, further comprising a protection circuit for rendering said first to fourth semiconductor switching elements non-conducting in response to breakage of at least any one of the third and fourth semiconductor switching elements.

7. The power conversion device according to claim 5, further comprising a protection circuit for rendering said first to fourth semiconductor switching elements non-conducting in response to flow of an overcurrent through the third and fourth semiconductor switching elements.

8. The power conversion device according to any of claims 1 to 3, being a three-level PWM converter for converting an AC voltage supplied through said AC line into a positive voltage, a negative voltage and a neutral point voltage and providing those voltages to said DC positive bus, said DC negative bus and said DC neutral point bus, respectively.

9. The power conversion device according to any of claims 1 to 3, being a three-level PWM inverter for converting a positive voltage, a negative voltage and a neutral point voltage supplied through said DC positive bus, said DC negative bus and said DC neutral point bus respectively to an AC voltage and providing the AC voltage to said AC line.

* * * * *

UNITED STATES PATENT AND TRADEMARK OFFICE
CERTIFICATE OF CORRECTION

PATENT NO. : 8,208,276 B2
APPLICATION NO. : 12/812709
DATED : June 26, 2012
INVENTOR(S) : Eduardo Kazuhide Sato et al.

It is certified that error appears in the above-identified patent and that said Letters Patent is hereby corrected as shown below:

On the title page, Item (73) Assignee: should read:

-- (73) Assignee: Toshiba Mitsubishi-Electric Industrial Systems Corporation, Tokyo (JP) --

Signed and Sealed this
Seventh Day of August, 2012

David J. Kappos
*Director of the United States Patent and Trademark Office*